US012775718B2

(12) United States Patent
Soman et al.

(10) Patent No.: US 12,775,718 B2
(45) Date of Patent: Oct. 27, 2026

(54) DYNAMIC PRIVILEGE MANAGEMENT IN A COMPUTER SYSTEM

(71) Applicant: Omnissa, LLC, Mountain View, CA (US)

(72) Inventors: Sisimon Soman, Sunnyvale, CA (US); Arnout Grootveld, Amsterdam (NL)

(73) Assignee: Omnissa, LLC, Mountain View, CA (US)

( * ) Notice: Subject to any disclaimer, the term of this patent is extended or adjusted under 35 U.S.C. 154(b) by 0 days.

(21) Appl. No.: 17/154,273

(22) Filed: Jan. 21, 2021

(65) Prior Publication Data

US 2022/0229916 A1 Jul. 21, 2022

(51) Int. Cl.
*G06F 21/60* (2013.01)

(52) U.S. Cl.
CPC .................................. *G06F 21/604* (2013.01)

(58) Field of Classification Search
CPC ..................................................... G06F 21/604
See application file for complete search history.

(56) References Cited

U.S. PATENT DOCUMENTS 5,113,442 A 5/1992 Moir
6,289,462 B1 9/2001 McNabb et al.
7,383,437 B1 6/2008 Dik
7,669,050 B2 2/2010 Blinick et al.
8,074,288 B2 12/2011 Sambotin et al.
8,442,960 B1 5/2013 Meyer et al.
8,677,477 B2 3/2014 Kim et al.
9,213,571 B2 12/2015 Ristovski et al.
9,348,742 B1 5/2016 Brezinski
10,419,469 B1 9/2019 Singh et al.
10,445,505 B2 10/2019 Rebelo
10,565,378 B1 2/2020 Mncent et al.
10,594,714 B2 3/2020 Crabtree et al.
10,747,875 B1 * 8/2020 Stoler .................. H04L 9/3247
2002/0188649 A1 12/2002 Karim
2005/0091658 A1 4/2005 Kavalam et al.
2005/0289545 A1 12/2005 Blinick et al.
2006/0053426 A1 3/2006 Dive-Reclus et al.
2006/0206489 A1 9/2006 Finnie et al.
2006/0253909 A1 11/2006 Cherepov
2007/0050369 A1 3/2007 Stiegler et al.
2007/0199068 A1 8/2007 Russinovich et al.
2008/0040398 A1 2/2008 Robinson et al.
2008/0134325 A1 6/2008 Kim et al.
(Continued)

OTHER PUBLICATIONS

Huculak, "How to create an automated task using Task Scheduler on Windows 10", archived May 2019, acquired from https://web.archive.org/web/20190515110012/https://www.windowscentral.com/how-create-automated-task-using-task-scheduler-windows-10 (Year: 2019).*

*Primary Examiner* — William R Korzuch
*Assistant Examiner* — Forrest L Carey
(74) *Attorney, Agent, or Firm* — Kim & Stewart LLP

(57) ABSTRACT

An example method of dynamic privilege management in a computer system includes: receiving a task name at a service configured to launch a process corresponding to the task name. The method also includes determining the process is associated with an elevated security context based on a policy that associates the task name with the elevated security context. The method also includes launching, by the service, the process using the elevated security context such that the process runs with elevated privileges.

19 Claims, 7 Drawing Sheets

(56) References Cited

U.S. PATENT DOCUMENTS

| | | | | |
|---|---|---|---|---|
| 2009/0007256 | A1* | 1/2009 | Raymond | G06F 21/41 726/19 |
| 2009/0328129 | A1 | 12/2009 | Desai et al. | |
| 2011/0185338 | A1 | 7/2011 | Mital et al. | |
| 2012/0101856 | A1 | 4/2012 | Tran et al. | |
| 2012/0110174 | A1 | 5/2012 | Wootton et al. | |
| 2013/0333056 | A1 | 12/2013 | Ristovski et al. | |
| 2014/0096182 | A1* | 4/2014 | Smith | H04L 63/061 726/1 |
| 2014/0201830 | A1 | 7/2014 | Kim et al. | |
| 2015/0180894 | A1 | 6/2015 | Sadovsky et al. | |
| 2015/0332043 | A1 | 11/2015 | Russello | |
| 2016/0099963 | A1 | 4/2016 | Mahaffey et al. | |
| 2016/0149924 | A1 | 5/2016 | Iverson et al. | |
| 2016/0254961 | A1 | 9/2016 | Maes | |
| 2016/0306964 | A1* | 10/2016 | Austin | G06F 21/556 |
| 2016/0380977 | A1 | 12/2016 | Bean et al. | |
| 2017/0024571 | A1* | 1/2017 | Nayberg | G06F 21/53 |
| 2017/0111368 | A1 | 4/2017 | Hibbert et al. | |
| 2017/0163666 | A1 | 6/2017 | Venkatramani et al. | |
| 2017/0235958 | A1 | 8/2017 | Khosravi et al. | |
| 2019/0005267 | A1 | 1/2019 | Soman et al. | |
| 2019/0243985 | A1* | 8/2019 | Goodridge | G06F 21/45 |
| 2019/0356736 | A1* | 11/2019 | Narayanaswamy | H04L 49/10 |
| 2020/0184074 | A1 | 6/2020 | Soman | |

* cited by examiner

DYNAMIC PRIVILEGE MANAGEMENT IN A COMPUTER SYSTEM

BACKGROUND

Today's enterprises rely on defense-in-depth mechanisms to protect endpoint computing devices from malware infection. Enterprises no longer rely on just traditional signature-based antivirus software, but rather have started to adopt technologies like role-based network containerization, smart network-level detection, and machine learning-based malware behavior detection. Traditional antivirus software cannot detect zero-day attacks. Instead, it may take a few days to weeks to update new malware signatures on every endpoint device. Additionally, most advanced detection and prevention systems work well only when the endpoint device is within the premises.

Once malware gains access to an endpoint, the malware attempts to control the device and use lateral movement mechanisms to spread to other endpoints and critical assets of the organization. Removing local administrator rights/privileges from domain user accounts active on the endpoints can limit an attacker's ability to move beyond the point of entry. Without administrator privileges, however, some legacy applications will not function correctly or at all. In addition, for bring-your-own-device (BYOD) endpoints, employees expect to retain administrator privileges on the endpoints. It is thus desirable to remove the need to retain full administrator privileges for domain users on endpoints, while maintaining functionality of legacy applications and meeting expectations of users.

SUMMARY

Techniques for dynamic privilege management in a computer system are described. In one aspect, a method of dynamic privilege management in a computer system is disclosed. The method includes receiving a task name at a service configured to launch a process corresponding to the task name. The method also includes determining the process is associated with an elevated security context based on a policy that associates the task name with the elevated security context. The method also includes launching, by the service, the process using the elevated security context such that the process runs with elevated privileges.

Certain aspects include a non-transitory computer-readable storage medium comprising instructions that cause a computer system to carry out the above method, as well as a computer system configured to carry out the above method.

DETAILED DESCRIPTION

Figure 1:
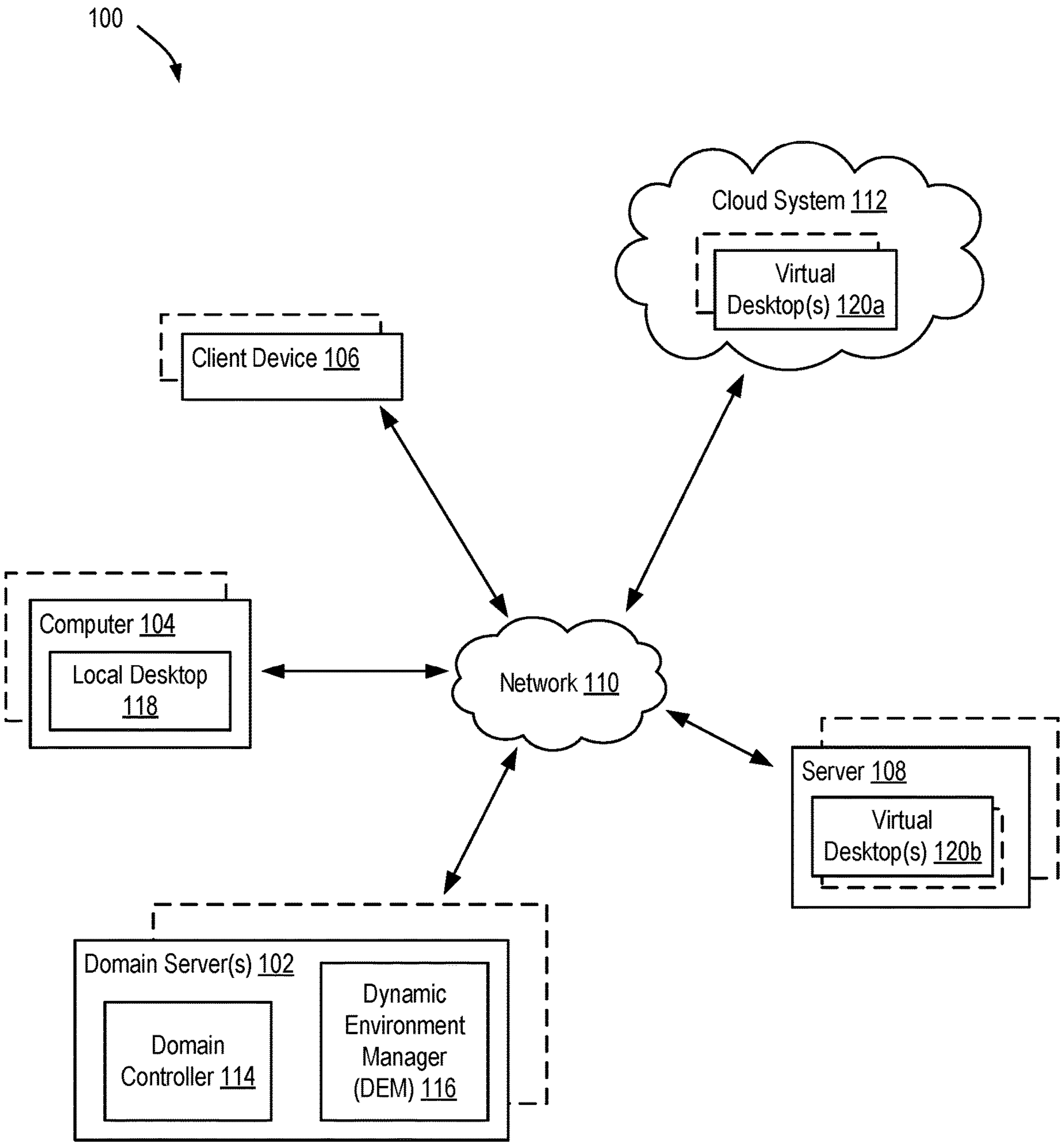
FIG. 1 is a block diagram illustrating a networked computer system, in accordance with certain aspects of the present disclosure.

There may be many use cases where it is useful to control the privilege level at which a process (e.g., an application, task, etc.) is executed on a computing device (e.g., a physical computing device, a virtual computing instance, a container, a virtual machine, a server, a workstation, a mobile device, a smartphone, a laptop, a tablet, etc.). For example, it may be useful to ensure processes are typically (e.g., by default) launched at a lower privilege level, such that if a malware process is accidentally launched, it has a reduced privilege level, thereby preventing it from accessing critical resources (e.g., kernel level memory areas) of the computing device. However, as discussed, launching all processes at such a lower privilege level may not be desirable. For example, certain legacy applications may require an elevated privilege level to run properly, or a user or administrator may want to run certain applications at a higher privilege level.

Accordingly, techniques are provided herein for controlling a privilege level at which a process is executed on a computing system. In particular, certain aspects of techniques provided herein are used to elevate a privilege level of a process. For example, the privilege level may be elevated prior to creation of the process or after creation and prior to launch and execution of the process. In particular, in certain aspects, the process may be launched with the elevated privilege level.

Further, techniques provided herein, in certain aspects, allow for the control of the privilege level used to launch and execute a child process from a parent process executing at an elevated privilege level. For example, a child process of a parent process executing at an elevated privilege level may be launched and executed at an unelevated privilege level, or an elevated privilege level. As discussed herein, the privilege level used to launch and execute such a child process may be determined based on rights (e.g., a security context (SC), such as a token) used for launching the parent process.

In certain aspects, a process may normally be launched and executed with an unelevated privilege level, such as having user-level privileges. An unelevated privilege level may also be referred to as a lower privilege level, and in certain aspects, may be a default privilege level used to launch and execute a process. Such an unelevated privilege level may provide the process with a relatively reduced set of access rights to resources of the computing device. For example, when executing at an unelevated privilege level, a process may not be able to access certain components (input/output (I/O) components) of the computing device, and/or may not be able to access (e.g., read from and/or write to) certain areas of memory of the computing device, etc. This can prevent the process from operating normally or operating at all.

In certain aspects, a process may be selected to be launched and executed with an elevated privilege level, such as having administrator privileges. An elevated privilege level may be referred to as a higher privilege level, and in certain aspects, may only be used to launch and execute particular processes identified (e.g., by an administrator). For example, an administrator may create a mapping/list/policy (e.g., whitelist) of processes that can be launched and executed with an elevated privilege level. For example, an elevated privilege level may allow the executing process to access a greater number of components (e.g., memory and computing resources) of the computing device, a greater number of areas of memory of the computing device, etc., as compared to an unelevated privilege level.

Certain aspects herein provide for privilege level control using SCs. For example, upon login by a user to a computing device, a SC is created, the SC associated with the privilege level at which processes launched and executed by the user run. The SC created may provide access rights corresponding to an unelevated privilege level as the user may have logged into an account that does not have additional rights (e.g., administrator privileges) associated with the user.

According to certain aspects described herein, a process or service running on the computing device may retrieve the created SC, and use the SC to create one or more additional SCs with different privileges associated with it. For example, the one or more additional SCs may include an elevated SC, an elevated SC with child process de-elevation, and an unelevated SC. Each of these one or more SCs may be generated for each of an applications and one or more tasks or processes that are performed by the application.

The elevated SC may be used to allow a user to launch and execute a process with elevated privileges. Further, a child process launched and executed from a parent process executing based on the elevated SC may also be launched and executed with elevated privileges.

The unelevated SC may be used to launch and execute a process with unelevated privileges. Further, a child process launched and executed from a parent process executing based on the unelevated SC may also be launched and executed with an unelevated privileges.

The elevated SC with child process de-elevation may be used to launch and execute a process with elevated privileges. Further, a child process launched and executed from a parent process executing based on the elevated SC with child process de-elevation may instead be launched and executed with unelevated privileges.

In certain aspects, an administrator may configure a policy with a mapping between processes and SCs. For example, the mapping may provide a correlation between one or more parameters of a task/process (e.g., task/process name, process identifier, etc.) and a corresponding one of the SCs. Accordingly, in certain aspects, when a process is to be launched, a user may input a task name that was previously configured by the administrator to a service. The service receives the task name and uses the policy to map the task name to a corresponding process and the special SC associated with the process. The service then launches the process and the process is executed using the associated special SC with the corresponding elevated privilege level. Thus, techniques herein advantageously allow dynamic privilege level control, thereby increasing security and usability of the computing device.

FIG. 1 is a block diagram depicting a networked computer system 100, in accordance with certain aspects. Networked computer system 100 includes multiple nodes, including domain servers 102, computers 104, client devices 106, cloud system 112, and servers 108, with each of the nodes communicatively coupled to one or more of the other nodes via a network 110. Network 110 can include local area network(s), wide-area network(s), and the like. Domain server(s) 102 execute software to implement a domain controller 114. Domain controller 114 manages a domain in which domain server(s) 102, computer(s) 104, client device (s) 106, and server(s) 108, as well as any virtual computing instance executing thereon, can be members. Domain controller 114 maintains user account information, authenticates domain users, and enforces security policies for objects in the domain.

Each computer 104 includes an operating system that provides a local desktop 118. In general, a desktop includes a graphical user interface (GUI) having icons, windows, toolbars, folders, wallpapers, desktop widgets, and the like, a command line interface (CLI), or a combination thereof. Local desktop 118 is presented locally to a user by an operating system executing on a computer 104. Computers 104 can be desktops, laptops, tablets, mobile telephones, or the like. For each computer 104 that is a member of the domain managed by domain controller 114, the respective operating system requires domain users to authenticate to domain controller 114 before starting a login session of local desktop 118.

Cloud system 112 and servers 108 may include virtualization software that manages multiple virtual machines (VMs), or other virtual computing instances. In certain aspects, the VMs of cloud system 112 and servers 108 each include a guest operating system that provides virtual desktops 120*a*/120*b* (collectively referred to as "virtual desktops 120"). Such a scheme is generally referred to as virtual desktop infrastructure (VDI). A virtual desktop 120 functions like a local desktop 118, but is accessed by users remotely rather than locally at a server 108. For example, a user can access a virtual desktop 120 of one or more of cloud system 112 or servers 108 using client device 106.

Cloud system 112 can include one or more servers for executing the VMs. The cloud system 112 servers and servers 108 may include computers having a conventional computing architecture (e.g., an x86 architecture) configured to execute the VMs having virtual desktops using a VDI scheme. In addition to VDI or as an alternative, cloud system 112 can provide virtual desktops as a service similar to a Software-as-a-Service (SAAS) scheme. Virtual desktops 120*a* in cloud system 112 can be provided by either or both types of schemes. The VMs can be members of the domain managed by domain controller 114. In such case, domain users may need to be authenticated by domain controller 114 before starting remote login sessions of a virtual desktop environment(s) 120.

In certain aspects, users can use a client device 106 to access a virtual desktop 120*a* provided by the cloud system 112 in a manner similar to accessing a virtual desktop 120*b*. That is, the cloud system 112 operating systems presenting virtual desktops 120*a* can belong to the domain managed by domain controller 114. Thus, as with accessing a virtual desktop provided by servers 108, domain users may first authenticate to domain controller 114 before starting remote login sessions of virtual desktops 120*a* provided by the cloud system 112. Client devices 106 can be computers, tablets, mobile telephones, or the like. Each client device 106 can include remote desktop client software that is configured to start a remote login session of virtual desktop 120*b* using a remote display protocol.

In some examples, servers 108 and/or cloud system 112 execute operating systems that include remote desktop session hosts (RDSH) functionality (e.g., terminal services). In this example, a single operating system on servers 108 and/or cloud system 112 can host multiple virtual desktops 120 concurrently. That is, a server 108 having an RDSH-capable operating system can provide multiple virtual desktops 120*b* to a single client device 106. The RDSH-capable operating system may execute directly on the server or within a VM. Cloud system 112 can include similarly configured servers to provide multiple virtual desktops 120*a* to a client device 106.

As used herein, a "desktop" encompasses the various types of local and virtual desktops in which users can create login sessions. Domain server(s) 102 may execute dynamic environment manager (DEM) 116 software (e.g., VMware Dynamic Environment Manager™) Dynamic environment manager 116 offers personalization and dynamic policy configuration across various desktops provided by operating systems of computers 104, servers 108, and cloud system 112 (such operating systems generally referred to as "endpoints"). Dynamic environment manager 116 manages the endpoints to present users with personalized and consistent settings across desktops. Dynamic environment manager 116 may implement dynamic privilege management on endpoints in the domain managed by domain controller 114. Specific features of dynamic privilege management are described below. While the techniques of dynamic privilege management are described with respect to implementation by dynamic environment manager 116, such techniques can be applied using different software. Notably, the techniques can be applied using software other than dynamic environment manager 116 (e.g., software having different functionality or software solely providing dynamic privilege management functionality). In some examples, dynamic environment manager 116 can execute on a server different from the domain server 102 having the domain controller 114. Domain controller 114 and/or dynamic environment manager 116 may also be executed in VMs on their respective server(s).

Many applications need elevated privileges (e.g., administrator privileges) to execute certain processes such as tasks or applications. Although a local security subsystem of an operating system can manage privileges at the user level, it cannot effectively control more granular privileges that effect certain tasks and applications at the process level. In embodiments, the dynamic privilege management techniques described herein allow an administrator (e.g., chief information security officer (CISO), or the like) to provide policies that elevate privileges for certain application tasks and processes. As such, the user is allowed to perform tasks and processes that were previously only available to the administrator. This frees up time that an administrator would have otherwise had to use for performing individual application tasks for each user.

Figure 2:
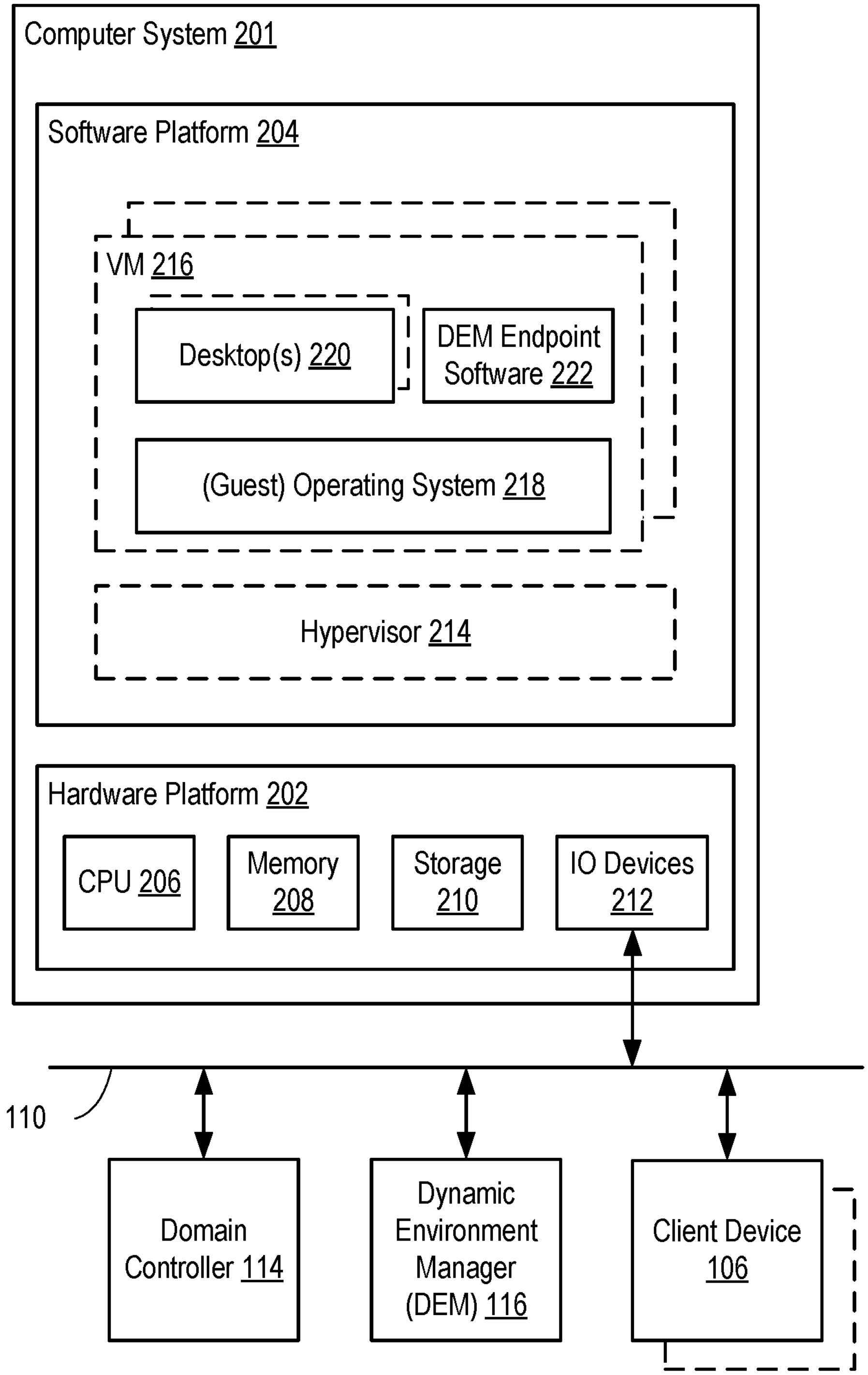
FIG. 2 is a block diagram depicting a computer system, in accordance with certain aspects of the present disclosure.

FIG. 2 is a block diagram depicting a computer system 201 according to certain aspects. Computer system 201 can be used as any of computers 104, servers 108, or servers in cloud system 112. Computer system 201 includes a software platform 204 executing on a hardware platform 202. Hardware platform 202 may include conventional components of a computing device, such as a central processing unit (CPU) 206 and system memory ("memory 208"), as well as a storage system ("storage 210"), input/output (TO) devices 212, and the like. CPU 206 is configured to execute instructions, for example, executable instructions that perform one or more operations described herein and may be stored in memory 208 and storage 210. Memory 208 is a device allowing information, such as executable instructions, virtual disks, configurations, and other data, to be stored and retrieved. Memory 208 may include, for example, one or more random access memory (RAM) modules. Storage 210 includes local storage devices (e.g., one or more hard disks, flash memory modules, solid state disks, and optical disks) and/or a storage interface that enables computer system 201 to communicate with one or more network data storage systems. Examples of a storage interface are a host bus adapter (HBA) that couples computer system 201 to one or more storage arrays, such as a storage area network (SAN) or a network-attached storage (NAS), as well as other network data storage systems. IO devices 212 include conventional interfaces known in the art, such as one or more network interfaces. IO devices 212 can be coupled to a network 110 for communication with domain controller 114, dynamic environment manager 116, and client device 106.

In certain aspects, software platform 204 includes a local operating system (OS) 218 that executes directly on hardware platform 202. Operating system 218 provides one or more desktops 220 and dynamic environment manager (DEM) endpoint software 222. DEM endpoint software 222 cooperates with dynamic environment manager 116 to implement dynamic privilege management as described further herein. The OS 218 can be any commodity operating system that functions as described below with respect to FIG. 3, such as Microsoft Windows® or like type operating systems.

In some examples, software platform 204 may include a hypervisor 214 that executes directly on hardware platform 202 (e.g., a "bare-metal" hypervisor). Hypervisor 214 is a virtualization layer that abstracts processor, memory, storage, and networking resources of hardware platform 202 into one or more virtual machines (VMs) 216 that run concurrently on computer system 201. One example of a hypervisor that may be used in aspects described herein is a VMware ESXi™ hypervisor provided as part of the VMware vSphere® solution made commercially available from VMware, Inc. of Palo Alto, California (although it should be recognized that any other virtualization technologies, including Xen® and Microsoft Hyper-V® virtualization technologies may be utilized consistent with the teachings herein). One or more virtual machines 216 run on top of hypervisor 214, which enables sharing of the hardware resources. In one example, the OS 218 is executed in the VM 216 as a guest operating system 218.

Virtualization technology allows a computer to run more than a single OS at the same time. That is, in some examples, a guest OS may be installed on either a VM or a partitioned disk used by the VM, and is separate from a local operating system that executes on the hardware platform. Accordingly, both the guest OS and local OS may run on the same computer system in parallel. Thus, as used herein, an "OS" or "operating system" encompass the local and guest operation systems in which users can create login sessions and which cooperate with dynamic environment manager (DEM) endpoint software 222.

Figure 3:
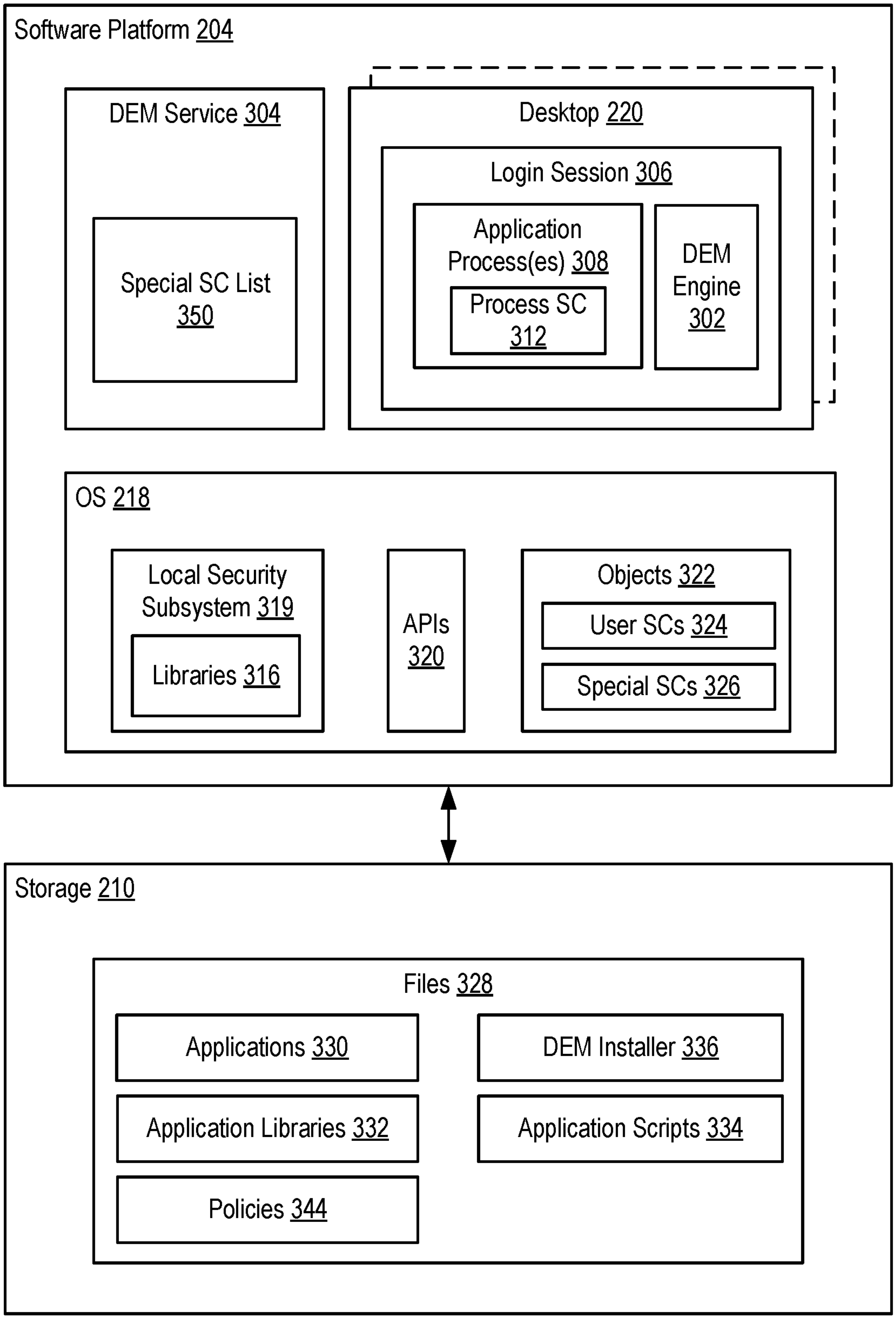
FIG. 3 is a block diagram illustrating a software platform of a computer system, in accordance with certain aspects of the present disclosure.

FIG. 3 is a block diagram depicting software platform 204 of computer system 201, in accordance with certain aspects. Software platform 204 includes operating system (OS) 218. OS 218 includes a local security subsystem 319, application programming interfaces (APIs) 320, and objects 322. Local security subsystem 319 (also referred to as local security authority subsystem (LSASS)) includes processes and associated libraries 316 that manage local security of OS 218. Local security subsystem 319 can manage various objects 322. In particular, local security subsystem 319 can create security context (SC) objects and write the SC objects to a registry. Libraries 316 may support APIs 320 that translate functions into native system calls.

OS 218 provides at least one desktop 220 (depending on whether RDSH functionality is present and enabled). Upon successful login by a user, desktop 220 provides a login session 306. The user can run one or more applications in login session 306, for which OS 218 creates application process(es) 308. Upon a successful login, local security subsystem 319 creates a user SC 324 for login session 306. For example, in a Microsoft Windows® operating system, a user SC 324 may also be referred to as a primary access token. In general, an SC includes information that describes a user account, security group(s) in which the user has membership, and privileges associated with the security group(s). The SC can include various other information, such as various identifiers, an expiration time, various flags, access control list (ACL) information, and the like. A user SC 324 includes an identifier of the logged-in user, identifier (s) of security group(s) in which the logged-in user has membership, and a list or privileges associated with the security group(s).

In some examples, the user is a domain user and an administrator configures domain controller 114 so that the domain user has the least privilege necessary to login to desktop 220 and launch applications (referred to herein as "unelevated privileges" or "user privileges"). For example, the user can be a member of the "users" security group, but not an "administrators" security group. The administrators security group has more privileges than the user security group (referred to herein as "elevated privileges" or "administrator privileges"). That is, administrator privileges are "elevated" with respect to the user privileges, meaning that the administrator has access to privileges that the user does not. Such elevated privileges may provide the administrator with increased control of OS 218 relative to a user that does not have such privileges elevated.

OS 218 includes a filesystem subsystem (not specifically shown) for accessing files 328 on storage 210. Files 328 include files associated with applications, such as application executables ("applications 330"), application libraries 332 (e.g., shared libraries, such as dynamic link libraries (DLLs)), application scripts 334, and the like. Files 328 can also include, at least temporarily, a DEM installer 336 that when executed installs DEM endpoint software 222. The DEM endpoint software 222 includes a DEM service 304 and a DEM engine 302. DEM service 304 is a user-mode service process that executes outside the context of login session 306 (i.e., DEM service 304 is not terminated with termination of login session 306). Upon user login to a desktop environment (or any other suitable user event or OS 218 event including, for example, execution of an application 330, an application process 308, etc.), DEM service 304 may execute the DEM engine 302 within the context of the login session 306.

Initially, an administrator may define elevation polices 344, including task- or process-based policies. For example, the administrator may create one or more tasks, and associate each of the one or more tasks with a particular process. For example, the administrator may create a task called "TaskA," and associate TaskA with a particular desktop 220 process, application process 308, a child process of the application process 308, an OS 218 process (e.g., filesystem process), or any other process and/or computer/memory resource used by the process to which an administrator may have privilege to access. Accordingly, the task name identifies a particular process. Thus, a user may execute the particular process by entering the task name in a command-line interface or a graphical user interface (GUI) that can map the task name to the process. Thus, when the process is launched, that process is launched by its task name set by the administrator, and not by the user directly launching the process from an application or executable that performs the process as part of its runtime.

In certain aspects, the administrator may configure the DEM service 304 with the policies 344. The administrator may store the policies 344 in storage 210 so that DEM service 304 has access to the policies 344. Alternatively, or in addition, the administrator may store the policies 344 in a domain server 102 to provide access to the policies 344 by the dynamic environment manager 116. In this example, DEM service 304 may request a specific one or more policies 344 from the dynamic environment manager 116 on an ad hoc basis. DEM service 304 may utilize the policies 344 to perform dynamic privilege management on software platform 204, as described in additional detail below.

In general, dynamic privilege management includes two phases: user login and privilege elevation (e.g., prior to creation of an application, prior to launch of an application, or even in some cases after launch of an application). At user login, DEM endpoint software 222 creates one or more special SCs for the logged-in user such as an elevated SC and an elevated SC with child process de-elevation. The special SCs 326 may be created based on the administrator defined policies 344 that indicate some processes can be elevated for a user. DEM endpoint software 222 keeps a reference to the special SCs 326 and the user's original SC (e.g., the user's primary access token) for future use. For privilege elevation, if permitted by policy, an application's process SC 312 is replaced with a duplicate of the special SC, which will provide the user with the elevated privileges required to access or perform that application's process.

Figure 4:
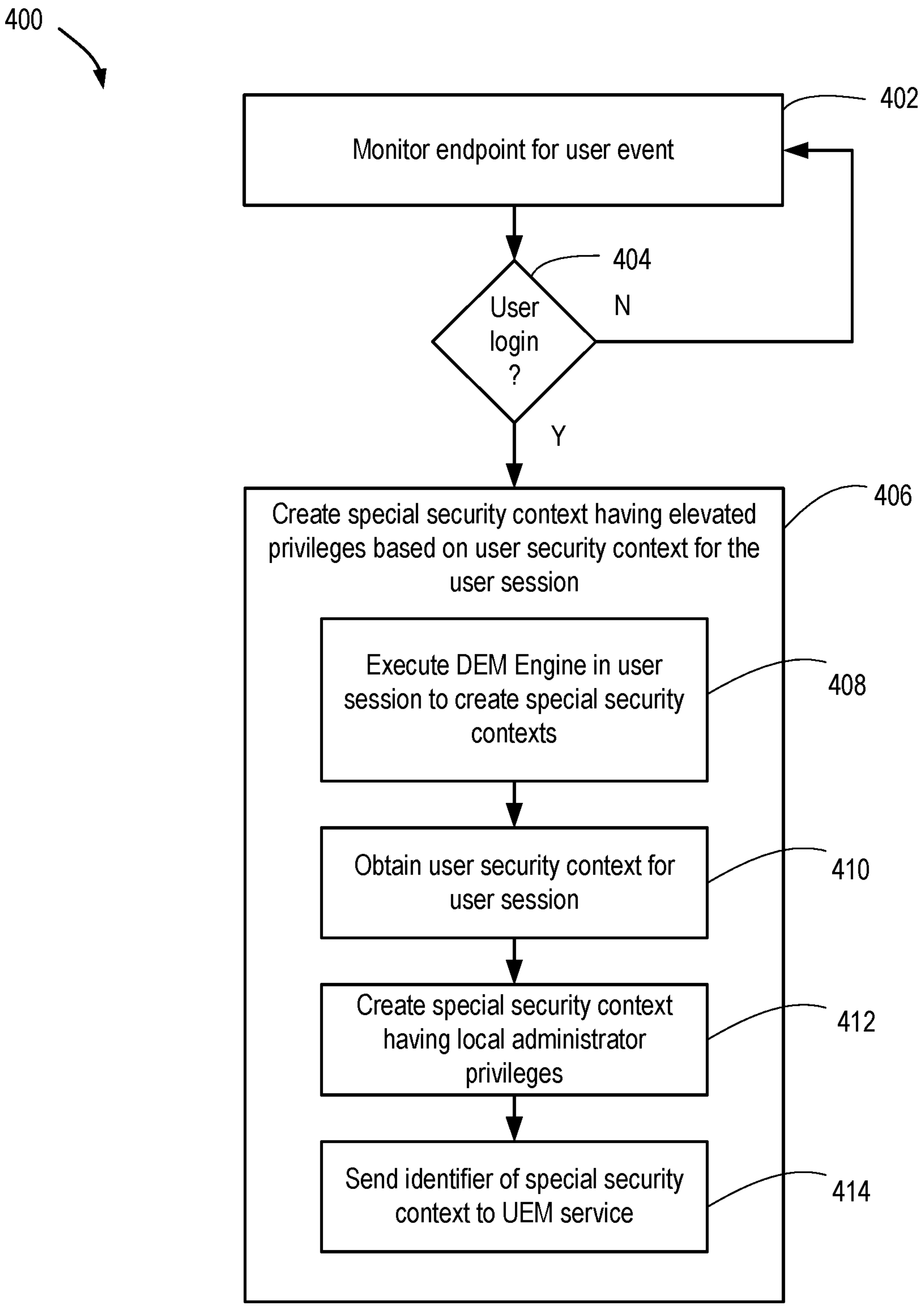
FIG. 4 is a flow diagram illustrating example operations for creating special security contexts (SCs), in accordance with certain aspects.

FIG. 4 is a flow diagram illustrating example operations 400 for creating special SCs, in accordance with certain aspects. Operations 400 begin at a first step 402, where DEM service 304 monitors OS 218 for user logins to desktop 220. DEM service 304 may register with OS 218 for notification of user logins. Upon user login, the local security subsystem 319 creates a user SC 324 for the user's login session 306. Several events may occur in response to a successful user login. For example, the OS 218 may send a user event notification to DEM service 304 with details of the logged on user (e.g., the user SC 324), and DEM service 304 may launch DEM engine 302 and pass the user SC 324 to the DEM engine 302.

At a second step 404, DEM service 304 waits for a log on notification from OS 218. If a log on notification is not received, operations 400 return to the first step 402 and monitoring is continued. If a log on notification is received, operations 400 proceed to a third step 406.

At the third step 406, DEM service 304 launches DEM engine 302 in response to receiving the user event notification, and passes the user SC 324 to the DEM engine 302. Once running, the DEM engine 302 creates one or more special SCs 326 based on the user SC 324, the one or more special SCs 326 configured to provide the user with one or more elevated privileges as discussed. In certain aspects, an elevated special SC 326 includes the attributes of user SC 324, but also includes administrator privileges (whereas the user SC 324 has user privileges), and allows child processes to be launched with administrator privileges.

In certain aspects, an elevated special SC 326 with child process de-elevation includes the attributes of user SC 324, and also includes administrator privileges. In this example, the administrator privileges of the elevated special SC 326 may be used to launch and execute a parent process with elevated privileges. However, a child process launched and executed from the parent process may be launched and executed with the unelevated user privileges of the user SC 324.

The third step 406 begins at a first sub-step 408, where DEM service 304 executes the DEM engine 302 within login session 306. In one example, the DEM service 304 executed the DEM engine 302 by sending an instruction to the DEM engine 302 to create special SCs. The DEM engine 302 has privileges sufficient to create SCs. A normal process does not have permission to create security contexts. Typically, only a process in local security subsystem 319 has such permission to create SCs. For example, in a Microsoft Windows® operating system, a process known as the LSASS has a privilege (e.g., SeCreateToken privilege) enabled that allows the LSASS to call native APIs 320 and create SCs. Accordingly, the DEM service 304 may use APIs 320 to obtain a process SC of the local security subsystem 319 process that creates SCs (e.g., the DEM service 304 may obtain the process token of the LSASS service that enables it to create SCs). DEM service 304 executes the DEM engine 302 with the process SC of the local security subsystem 319, which allows the DEM engine 302 to create special SCs (e.g., the DEM engine 302 has SeCreateToken privilege enabled, allowing it to call native APIs 320 and create SCs).

At a second sub-step 410, the DEM engine 302 obtains the user SC 324 from the DEM service 304 for login session 306. In certain aspects, the DEM engine 302 and the DEM service 304 communicate data between each other, and other subsystems and processes of the software platform 204 using remote procedure call (RPC). For example, in a Microsoft Windows® operating system, a Microsoft RPC API of the APIs 320 or a local inter-process communication (LPC) may be used for such communications. The DEM service 304 may establish the communication path with the DEM engine 302 prior to, or during execution of DEM engine 302.

At a third sub-step 412, the DEM engine 302 creates one or more special SCs 326 that include attributes of the user SC 324 (e.g., identifiers, expiration time, flags, user identifiers, security group identifiers, etc.), as well as administrator privileges and/or additional other privileges. For example, in a Microsoft Windows® OS, the DEM engine 302 can create a special SC 326 that includes attributes of the user SC 324 (e.g., IDs, privileges, security identifiers (SIDs) of the user and associated security groups, discretionary access control list (DACL), etc.). In some examples, the additional other privileges may include user rights (e.g., impersonate a client after authentication privilege (SeImpersonatePrivilege), etc.).

In some examples, the DEM engine 302 may add an administrator group (e.g., BUILTIN\Administrators security group) to the special SC 326 to allow the special SC 326 to be used to elevate user privileges. In certain aspects, local security subsystem 319 also includes integrity control, where processes can execute with different integrity levels (e.g., untrusted, low, medium, high, system, etc.). By default, SCs are created with untrusted integrity. User SC 324 can have an identifier for a particular integrity level. The DEM engine 302 may search for this identifier in the user SC 324 and replace it (or add one if not present) with an identifier for high integrity (e.g., SID S-1-16-1288 in Microsoft Windows Vista® or later). The integrity level of the user SC 324 can be reduced after creation of a special SC 326. For example, DEM endpoint software 222 can decrease integrity of the user SC 324 if necessary at the time an application or other process is launched. In certain aspects, the DEM engine 302 may write the created special SCs to a database (e.g., Windows registry).

At a fourth sub-step 414, the DEM engine 302 sends an identifier of each special SC 326 to DEM service 304. DEM service 304 can maintain a list of special SCs ("special SC list 350") that includes one or more identifiers of special SCs 326 that have been created for one or more logged in users.

Figure 5:
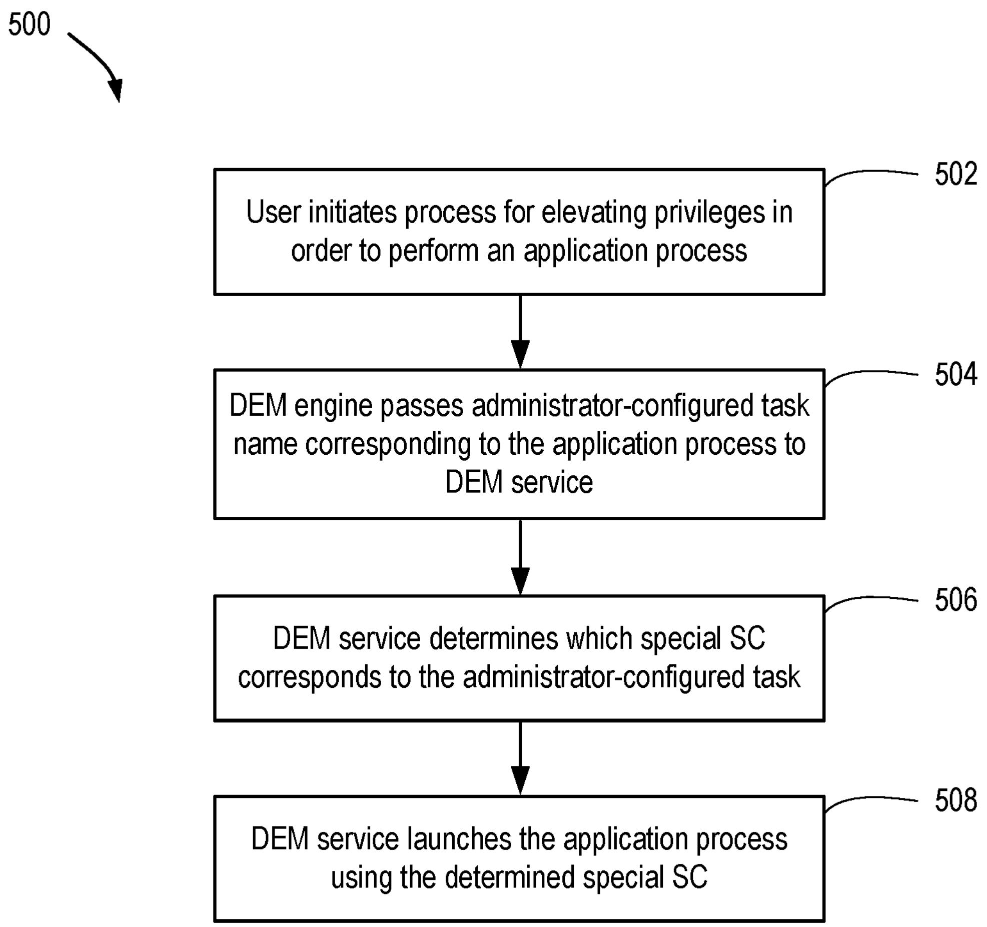
FIG. 5 is a flow diagram illustrating example operations for launching processes with elevated privilege at an endpoint, in accordance with certain aspects.

FIG. 5 is a flow diagram illustrating example operations 500 for launching processes with elevated privileges at an endpoint, in accordance with certain aspects. Operations 500 begin at a first step 502, where the user initiates a launch process of an application process 308 in the login session 306 prior to the process 308 actually launching. In certain aspects, the user may use a command-line interface or graphical user interface (GUI) to elevate user privilege levels in order to launch the application process 308 by inputting information related to the process into the command-line or GUI. For example, the user may input an administrator-configured task name and one or more of an install path, an executable software instance for elevating user privileges (e.g., DemEngine.exe), or a command (e.g., LaunchTask). In one example, the application process 308 may be launched based on the task name associated with the application process 308 and not necessarily based on an executable name.

It should be noted that a launch process of an application process 308 may also be initiated in a logoff session. In this case, the process may be initiated by a user prior to the logoff, or a processing system of the endpoint may initiate the process within the logoff session. For example, the user or the processing system may pass a task name to the DEM engine 302. In some examples, one or more of the DEM engine 302 and the DEM service 304 are registered with the OS 218 and configured to receive an indication of the login or logoff session from the IS 218.

Accordingly, whether the process is initiated during a login session or a logoff session, the disclosed operations 500 are unlike systems that elevate an entire executable or application in order to launch a process of the executable or application, because the disclosed operations 500 are configured to elevate a particular process identified by the user or processing system without elevating the entire executable or application of the particular process.

At a second step 504, the DEM engine 302 communicates the task name to the DEM service 304. In some examples, the DEM engine 302 uses RPC to communicate the task name. The DEM engine 302 may communicate a LaunchTask message having the task name as a parameter, thereby instructing the DEM service 304 to launch the identified task.

At a third step 506, in response to receiving the communication from the DEM engine 302, the DEM service 304 checks the user security identifier of the user SC 324, and fetches the special SC 326 corresponding to the task (e.g., reads the special SC 326 from the registry or other OS 218 storage location) such as based on additional task details (e.g., such as the application file name and application file path) mapping to the special SC 326. The task details may include the application process 308 name and other parameters associated with the application process 308. In some examples, the DEM service 304 may check the policies 344 to confirm that the administrator allows the elevated privileges for a particular task. If the policies 344 do not provide elevated privileges for the task, the DEM service 304 may provide an error and/or end the operation 500.

At a fourth step 508, the DEM service 304 launches the application process 308 using the determined special SC 326. Here, the application process 308 is performed at an elevated privilege provided by the special SC 326. In some examples, the DEM service 304 may only launch the application process 308 after confirming that the policies 344 allow for elevated privileges for the application process 308.

Figure 6:
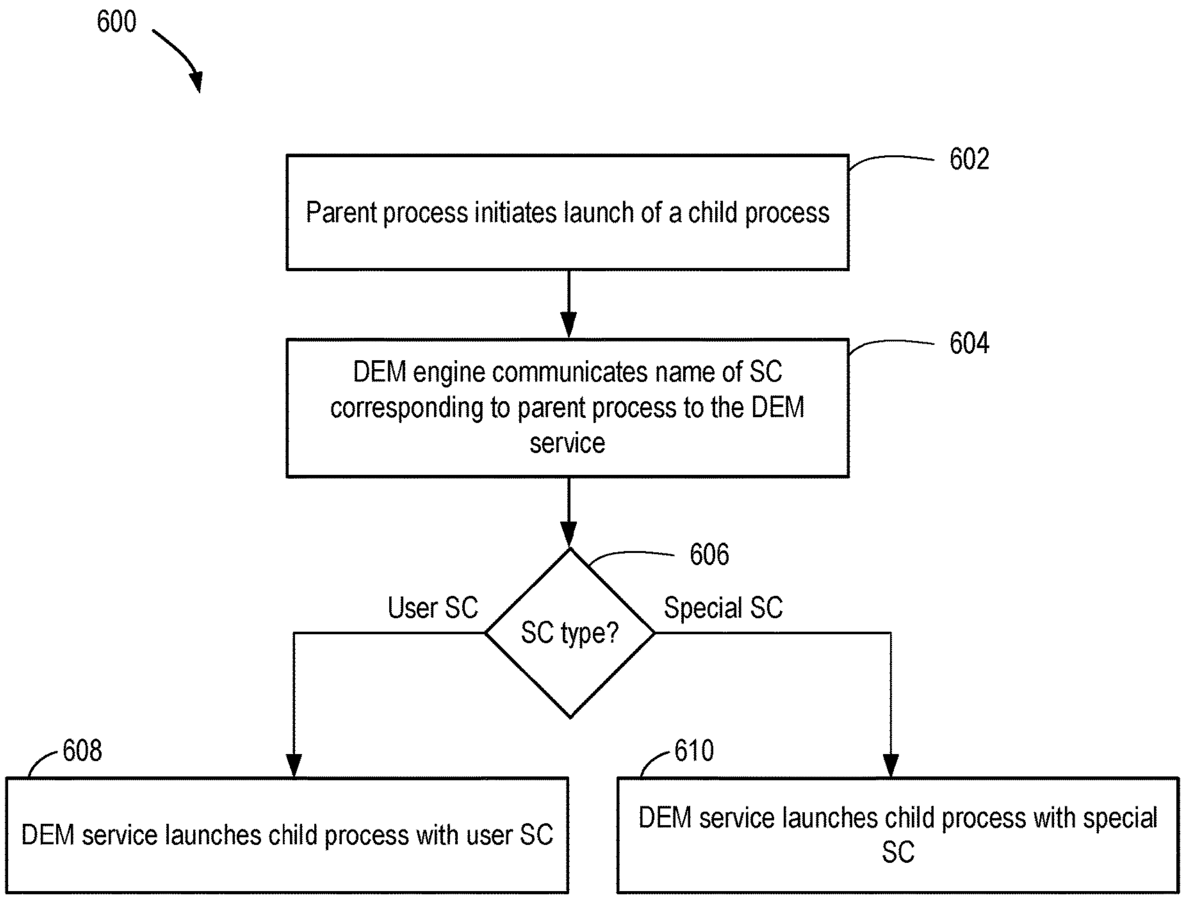
FIG. 6 is a flow diagram illustrating example operations for launching a child process from a parent process executing with elevated privileges at an endpoint, in accordance with certain aspects.

FIG. 6 is a flow diagram illustrating example operations 600 for launching a child process from a parent process (e.g., application process 308) executing with elevated privileges at an endpoint, in accordance with certain aspects. At a first step 602, the parent process initiates a launch process of a child process in the login session 306, prior to the child process actually launching. For example, the parent process may execute a command to initiate launch of the child process by the DEM engine 302.

At a second step 604, the DEM engine 302 communicates an SC name of the parent process to the DEM service 304. In some examples, the DEM engine 302 uses RPC to communicate the SC name.

At a third step 606, in response to receiving the communication from the DEM engine 302, the DEM service 304 determines a type of the SC 326 associated with the SC name, such as whether it is an elevated SC, or an elevated SC with child process de-elevation.

At a fourth step 608, if the determined type of the SC 326 associated with the parent process is an elevated SC with child process de-elevation, the DEM service 304 launches the child process with user SC 324 with unelevated privileges.

At a fifth step 610, if the determined type of the SC 326 associated with the parent process is an elevated SC, the DEM service 304 launches the child process with an SC 326 with elevated privileges. In some aspects, the SC 326 used to launch the child process is an elevated SC with child process de-elevation to prevent the child from further launching child processes with elevate privileges. In some aspects, the SC 326 used to launch the child process is a special SC.

Figure 7:
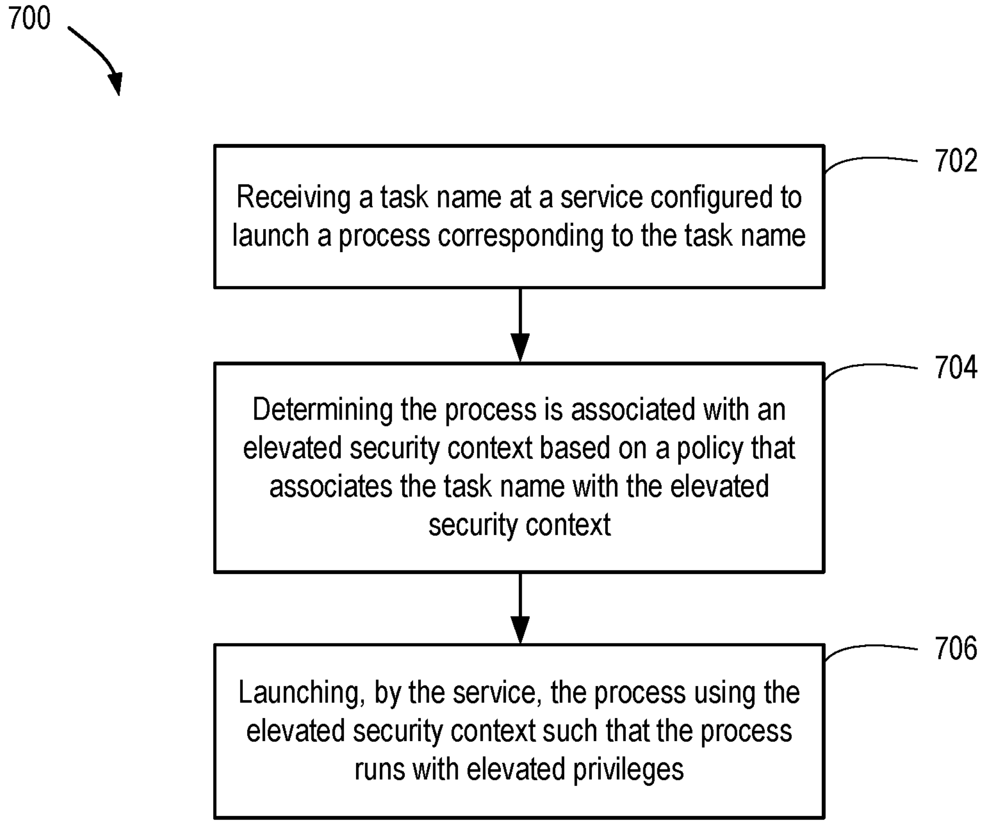
FIG. 7 is a flow diagram illustrating example operations for launching processes with elevated privileges at an endpoint via dynamic environment manager (DEM) software, in accordance with certain aspects To facilitate understanding, identical reference numerals have been used, where possible, to designate identical elements that are common to the figures. It is contemplated that elements disclosed in one aspect may be beneficially utilized on other aspects without specific recitation.

FIG. 7 is a flow diagram illustrating example operations 700 for launching processes with elevated privileges at an endpoint via dynamic environment manager (DEM) software 116, in accordance with certain aspects. Operations 700 begin at a first step 702, where the DEM engine 302 receives a task name configured to launch a process corresponding to the task name. As discussed, the user may initiate the launch of the process by passing the task name to the DEM engine 302 by way of a command-line interface or graphical user interface (GUI).

At a second step 704, the DEM engine 302 passes the task name to a DEM service 304 which determines what process is associated with an elevated security context based on a policy that associates the task name with the elevated security context and the process.

At a third step 706, the DEM service 304 launches the process using the elevated security context such that the process runs with elevated privileges.

In certain aspects, receiving and the launching are performed during one of a login or logoff of a session.

In certain aspects, the elevated security context comprises an elevated security context with child process de-elevation. In this example, operations 700 may also include receiving a request to launch a child process of the process, and launching, by the service, the child process using an unelevated security context.

In certain aspects, operations 700 also include receiving a request to launch a child process of the process, wherein determining the elevated security context associated with the process further comprises determining the elevated security context is associated with the child process, and launching the child process using the elevated security context.

In certain aspects, the launching is performed during a session associated with an unelevated security context, wherein the service is registered with an operating system of the computer system and configured to receive an indication of the session from the operating system.

In certain aspects, the policy comprises a mapping of the task name to both the process and the elevated security context. In this example, determining the process is associated with the elevated security context further comprises determining, by the service, the process and the elevated security context associated with the task name. In this example, the launching the process further comprises launching, by the service, the process using the elevated security context in response to receiving the task name.

In certain aspects, operations 700 also include creating the elevated security context from an unelevated security context upon initialization of a login session. In certain aspects, the creating is performed by a process in a local security subsystem having privileges to create security contexts.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of dynamic privilege management in a computer system, the computer system executing an operating system (OS), the method comprising:

receiving, by a service configured to launch processes in a login session of a desktop managed by the OS, a process security context of a local security subsystem of the OS, the process security context having privilege sufficient to create security contexts, the service executing on the computer system outside of the login session;

receiving, by the service, a user security context created by the local security subsystem for the login session;

executing, by the service, an engine in the login session and having the process security context;

creating, by the engine, a special security context that is elevated with respect to the user security context, the special security context having attributes of the user security context and one or more additional privileges;

receiving, by the engine, a task configured to launch a process by the OS having a name that is mapped to a name of the task;

sending, prior to the process being launched by the OS, the special security context and the task from the engine to the service;

determining, by the service prior to the process being launched by the OS, that a policy permits privilege elevation of the process having the name of the task; and launching, by the service in cooperation with the OS, the process using the special security context as an initial security context of the process.

2. The method of claim 1, wherein the receiving of the task and the launching of the process are performed during one of a login or logoff of the login session.

3. The method of claim 1, wherein the special security context comprises child process de-elevation, the method further comprising:

launching, by the service in cooperation with the OS, a child process using an unelevated security context.

4. The method of claim 1, further comprising:

launching, by the service in cooperation with the OS, a child process of the process using the special security context.

5. The method of claim 1, wherein the service is registered with the OS and configured to receive an indication of the login session from the OS.

6. The method of claim 5, wherein the service uses a remote procedure call to establish a communication path with the engine.

7. The method of claim 6, further comprising creating the special security context from a local security context upon initialization of the login session.

8. The method of claim 1, wherein the engine receives the task prior to the process being launched by the OS.

9. A non-transitory computer-readable medium comprising instructions that, when executed by one or more processors of a computing system, cause the computing system to perform operations for dynamic privilege management, the operations comprising:

receiving, by a service configured to launch processes in a login session of a desktop managed by an operating system (OS) executing on the computing system, a process security context of a local security subsystem of the OS, the process security context having privilege sufficient to create security contexts, the service executing on the computing system outside of the login session;

receiving, by the service, a user security context created by the local security subsystem for the login session;

executing, by the service, an engine in the login session and having the process security context;

creating, by the engine, a special security context that is elevated with respect to the user security context, the special security context having attributes of the user security context and one or more additional privileges;

receiving, by the engine, a task configured to launch a process by the OS having a name that is mapped to a name of the task;

sending, prior to the process being launched by the OS, the special security context and the task from the engine to the service;

determining, by the service prior to the process being launched by the OS, that a policy permits privilege elevation of the process having the name of the task; and launching, by the service in cooperation with the OS, the process using the special security context as an initial security context of the process.

10. The non-transitory computer-readable medium of claim 9, wherein the receiving of the task and the launching of the process are performed during one of a login or logoff of the login session.

11. The non-transitory computer-readable medium of claim 9, wherein the special security context comprises child process de-elevation, the operations further comprising:

launching, by the service in cooperation with the OS, a child process using an unelevated security context.

12. The non-transitory computer-readable medium of claim 9, the operations further comprising:

launching, by the service in cooperation with the OS, a child process of the process using the special security context.

13. The non-transitory computer-readable medium of claim 9, wherein the service is registered with the OS and configured to receive an indication of the login session from the OS.

14. The non-transitory computer-readable medium of claim 13, wherein the service uses a remote procedure call to establish a communication path with the engine.

15. The non-transitory computer-readable medium of claim 14, the operations further comprising creating the special security context from a local security context upon initialization of the login session.

16. A computer system, comprising:

one or more processors; and a memory, the one or more processors and the memory configured to cause the computer system to execute an operating system (OS) and to:

receive, by a service configured to launch processes in a login session of a desktop managed by the OS, a process security context of a local security subsystem of the OS, the process security context having privilege sufficient to create security contexts, the service executing outside of the login session;

receive, by the service, a user security context created by the local security subsystem for the login session;

execute, by the service, an engine in the login session and having the process security context;

create, by the engine, a special security context that is elevated with respect to the user security context, the special security context having attributes of the user security context and one or more additional privileges;

receive, by the engine, a task configured to launch a process by the OS having a name mapped to a name of the task;

send, prior to the process being launched by the OS, the special security context and the task from the engine to the service;

determine, by the service prior to the process being launched by the OS, that a policy permits privilege elevation of the process having the name of the task; and launch, by the service in cooperation with the OS, the process using the special security context as an initial security context of the process.

17. The computer system of claim 16, wherein the one or more processors and the memory are configured to cause the computer system to receive the task and launch the process during one of a login or logoff of the login session.

18. The computer system of claim 16, wherein the special security context comprises child process de-elevation, and the one or more processors and the memory are further configured to cause the computer system to:

launch, by the service in cooperation with the OS, a child process using an unelevated security context.

19. The computer system of claim 16, the one or more processors and the memory are further configured to cause the computer system to:

launch, by the service in cooperation with the OS, a child process of the process using the special security context.

* * * * *